United States Patent [19]

Kuo

[11] Patent Number: 5,540,256
[45] Date of Patent: Jul. 30, 1996

[54] WATER LEVEL LOCKING DEVICE FOR WATER TANKS

[76] Inventor: Chao-Tzung Kuo, No. 53, Lane 561, Ta An St., Tainan, Taiwan

[21] Appl. No.: 391,012

[22] Filed: Feb. 21, 1995

[51] Int. Cl.⁶ .......................... F16K 31/20; F16K 33/00
[52] U.S. Cl. .................... 137/421; 137/630.14; 251/230
[58] Field of Search .................... 137/420, 421, 137/445, 630.14, 630.15, 442, 446; 251/73, 74, 230

[56] References Cited

U.S. PATENT DOCUMENTS

| | | | |
|---|---|---|---|
| 756,397 | 4/1904 | McNamara | 137/421 |
| 1,202,238 | 10/1916 | Stokes | 137/421 |
| 1,382,027 | 6/1921 | Sweeny | 137/420 |
| 1,960,519 | 5/1934 | Warner | 137/421 |
| 1,998,478 | 4/1935 | Williams | 137/420 |
| 2,296,219 | 9/1942 | Miller | 137/421 |
| 3,040,769 | 6/1962 | Lamb | 137/420 |
| 3,363,643 | 1/1968 | Skulski | 137/421 |
| 3,401,717 | 9/1968 | Lamb | 137/421 |
| 3,570,527 | 3/1971 | Fritz | 137/421 |
| 3,726,303 | 4/1973 | Allen et al. | 137/630.15 |
| 4,342,328 | 8/1982 | Matta | 137/630.14 |

*Primary Examiner*—George L. Walton
*Attorney, Agent, or Firm*—Morton J. Rosenberg; David I. Klein

[57] ABSTRACT

A water level locking device for water tanks includes a stop valve for stopping water from flowing in a tank when water level reaches a preset highest level and for letting water flow in the tank when water level falls down to a preset lowest level, and a housing for containing components of the locking device except the stop valve.

3 Claims, 9 Drawing Sheets

WATER LEVEL LOCKING DEVICE FOR WATER TANKS

BACKGROUND OF THE INVENTION

This invention concerns a water level locking device for water tanks, particularly one used for water tanks installed on top of buildings, for precisely stopping water from flowing in the tank when the water level in a water tank has reached a preset maximum level and allowing water to flow in when the water level falls below a preset minimum level.

Figure 9:
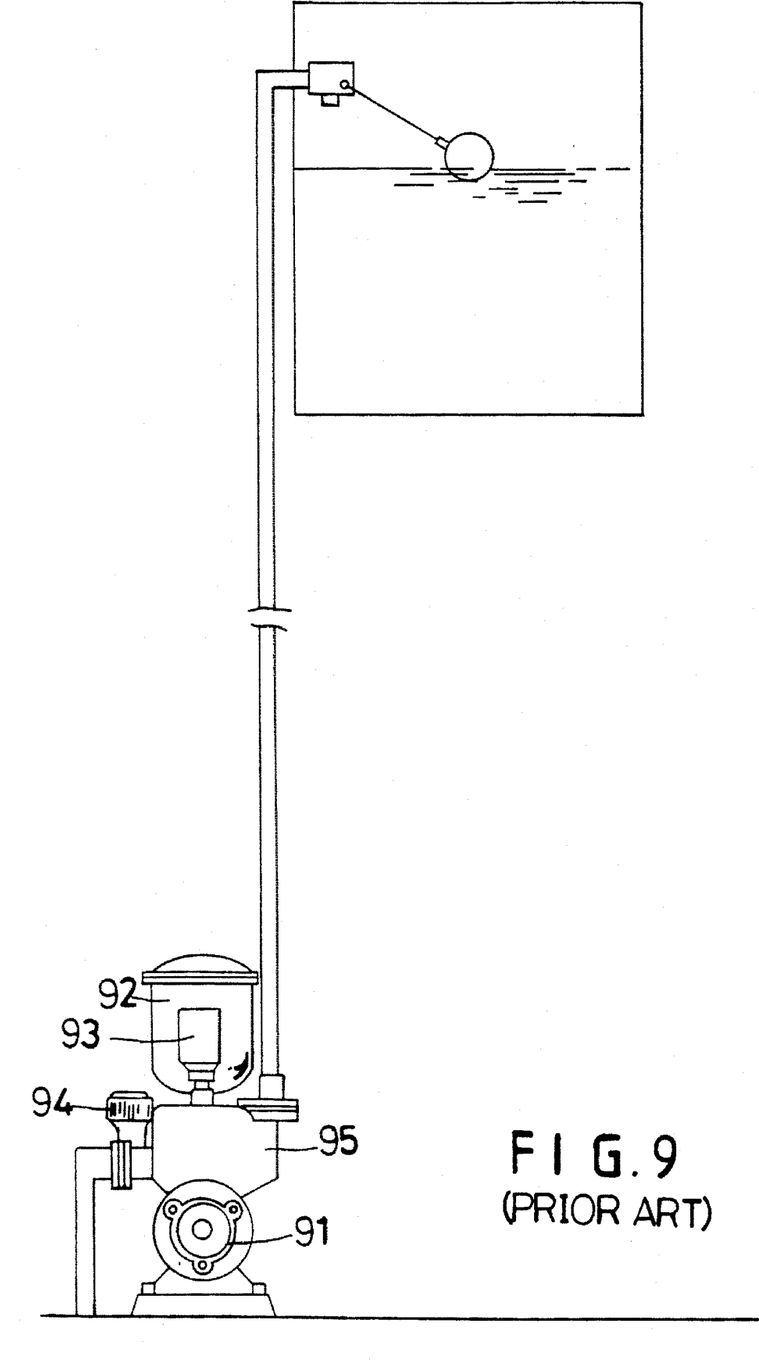
FIG. 9 is a schematic view of a prior art mechanical water level locking device installed in a tank with a pumping device; and, FIG. 10 is a schematic view of a prior art electrical water level locking device installed in a tank with a pumping device.
Figure 10:
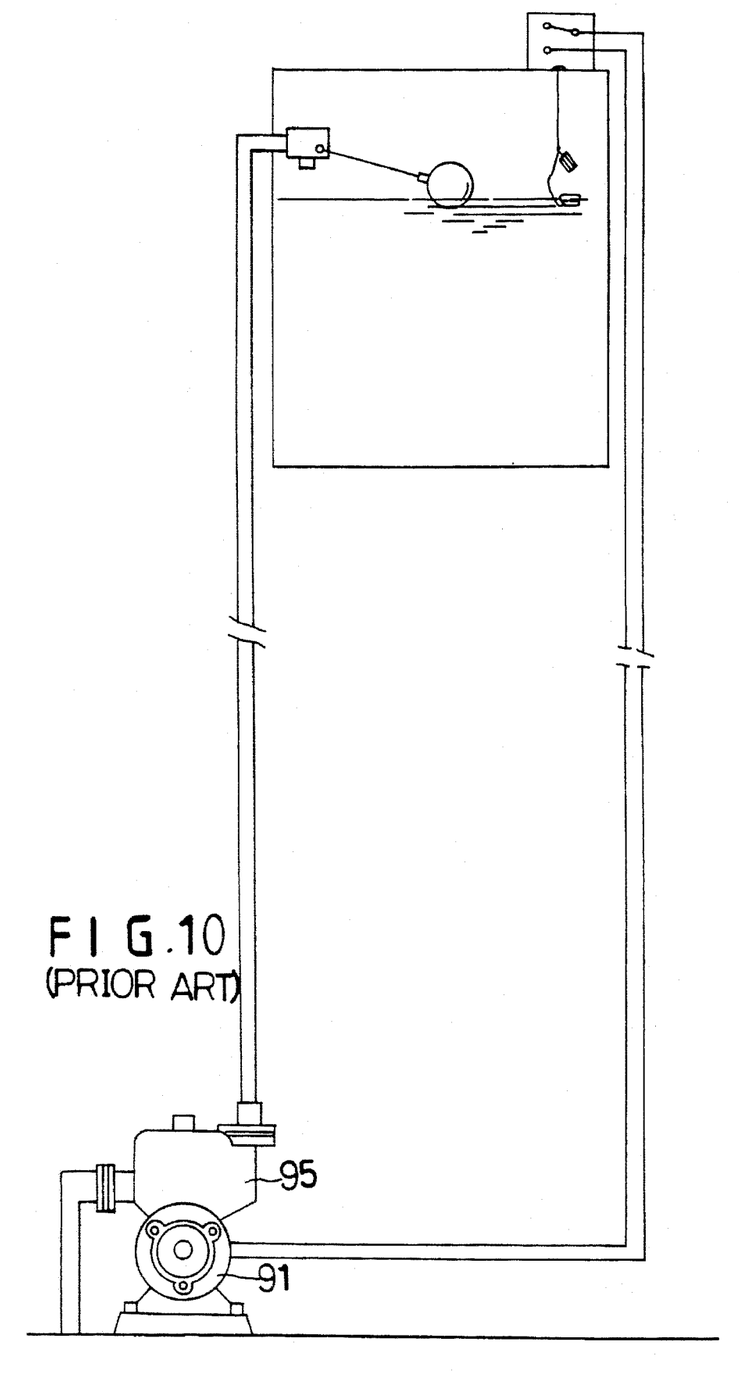

A prior art mechanical device for controlling water level in a tank is shown in FIG. 9, and a similar prior art device having electrically-controlled actuation is shown in FIG. 10. The device of FIG. 9 operates by use of a float-coupled lever which positions a cone-shaped stopper to stop water from flowing in to the tank when the float rises with the water to the preset maximum water level. The device of FIG. 10 incorporates with a cone-shaped stopper and a float-coupled lever and electric switch and a meter to control water level.

These types of water level locking devices in the prior art have been found to have the following disadvantages:
1. The water level locking devices employ a cone-shaped stopper which tends to allow water to flow into the tank upon slight displacement of the float, a gap being formed between the stopper and the outlet thereby. Consequently, the tank is often unnecessarily supplied with water, extraneous noise is unnecessarily produced.
2. The devices employ a push rod coupled to the float to directly control stoppage or opening of the outlet. Water tanks installed on high buildings are often supplied with a high-pressure pump means to inject water therein, and the closing pressure applied on the stopper by the water contained in the tank may be insufficient to block the incoming water flow.
3. If an electric water level controller is employed, electric wires must be extended to the roof of a building, adding additional expense and labor to installation and maintenance.
4. Devices which employ a pressure pump include a motor 91, a pressure tank 92, a pressure switch 93, and a stop valve 94. These devices suffer from shortcomings such as noisy operation, short service life of the motor, and the high cost of the pressure tank.
5. In such devices employing a pressure pump, the limit switch for controlling water level is usually turned off to let the motor remain inoperative when water in the water supply is under enough pressure to be forced up to the tanks on top of a given building. Consequently, there are opportunities for the pump leaves and the shaft seals to rust and cease operation. Worse yet, the motor may be impaired when subsequently turned on.
6. Also, in such devices, extra wiring necessary for the electric device that controls water level may increase cost even for installation in residential homes, and may result in unsightly wiring if installation is not performed during construction of the home.

SUMMARY OF THE INVENTION

This invention has been devised to offer a mechanical water level locking device for water tanks, improved to overcome the shortcomings mentioned above.

A main feature of the present invention is that when water level in a tank is gradually rising beyond a preset minimum level, a push arm pushes a slide block fixed on a first shaft, forcing a locking plate attached to the slide block to engage a notch of a position rod and then moving down the other end of the position rod, with the locking plate contacting and pushing back a soft pusher, which then will push a pawl to retreat until the pawl separates from a ratchet tooth of a fan-shaped block, and simultaneously forcing the position rod to contact the soft stopper to let a swing arm swing down to close a stop valve for stopping water from flowing in the tank, when the water level reaches a preset maximum position.

BRIEF DESCRIPTION OF THE DRAWINGS

The invention will be better understood by reference to the accompanying Drawings, wherein.

DESCRIPTION OF THE PREFERRED EMBODIMENTS

Figure 1:
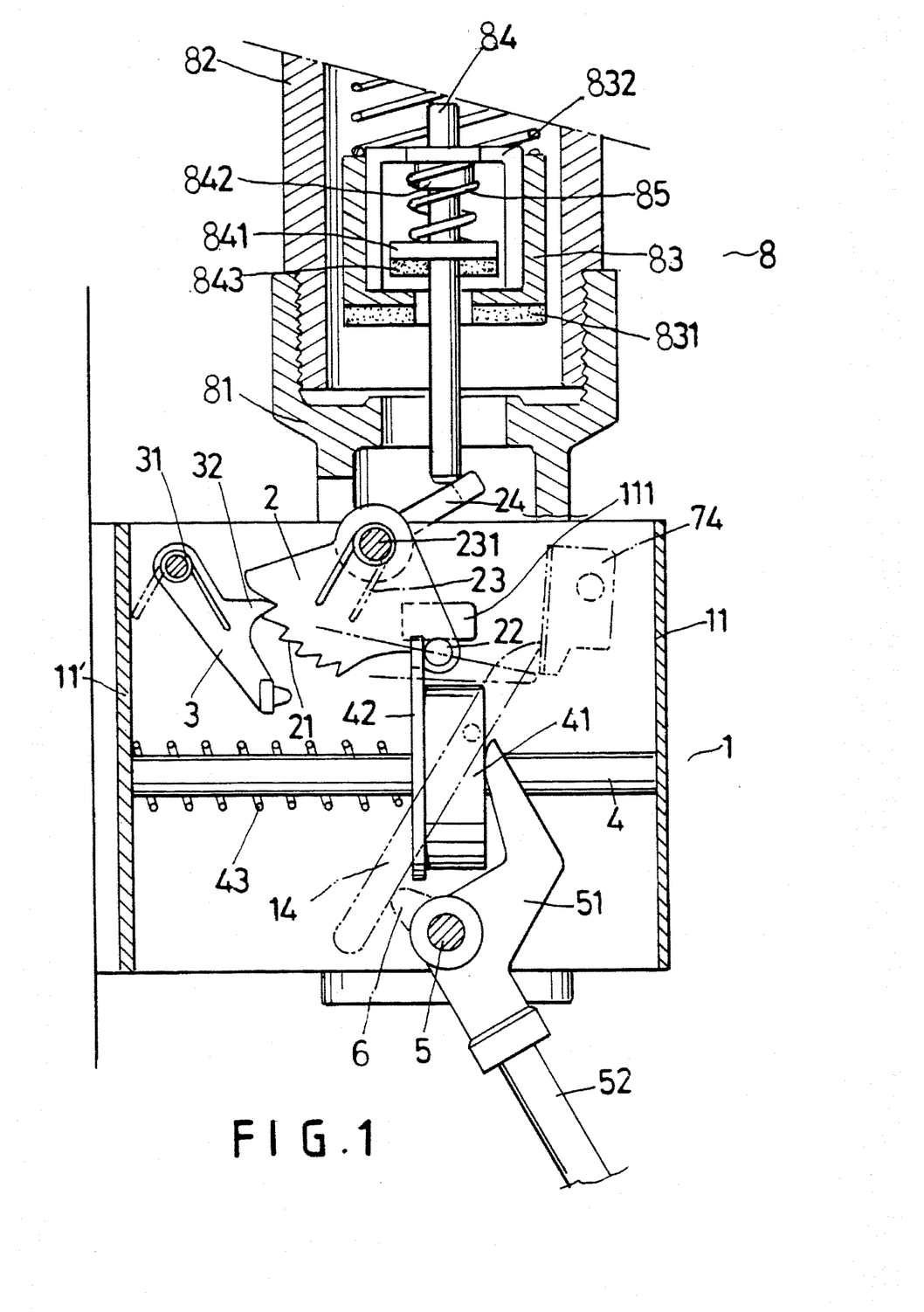
FIG. 1 is a first elevational view, partially cut-away, of a preferred embodiment of the water level locking device in the present invention, with water flowing into a tank.
Figure 2:
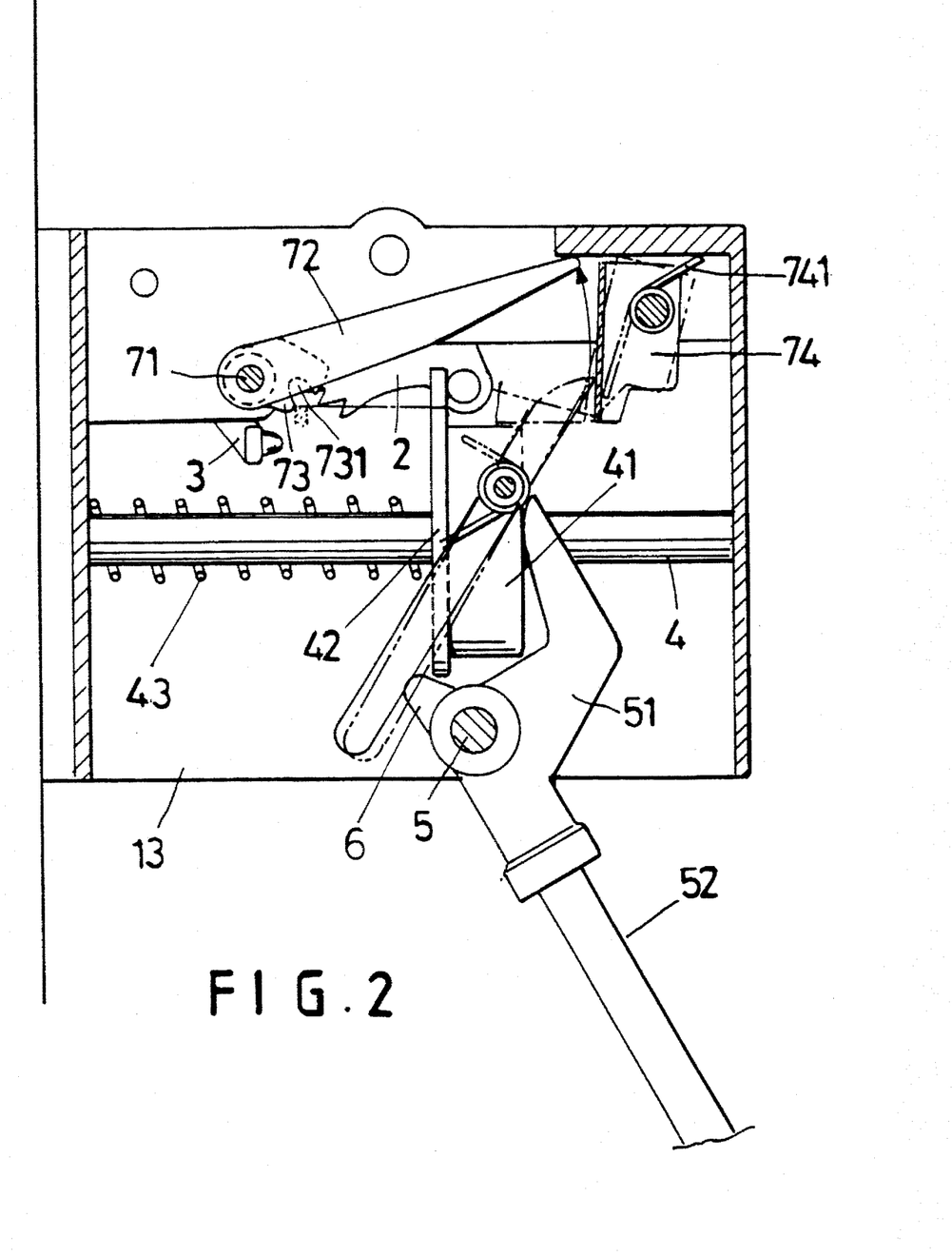
FIG. 2 is a second elevational view, partially cut-away, of a preferred embodiment of the water level locking device in the present invention, with water flowing into the tank.
Figure 3:
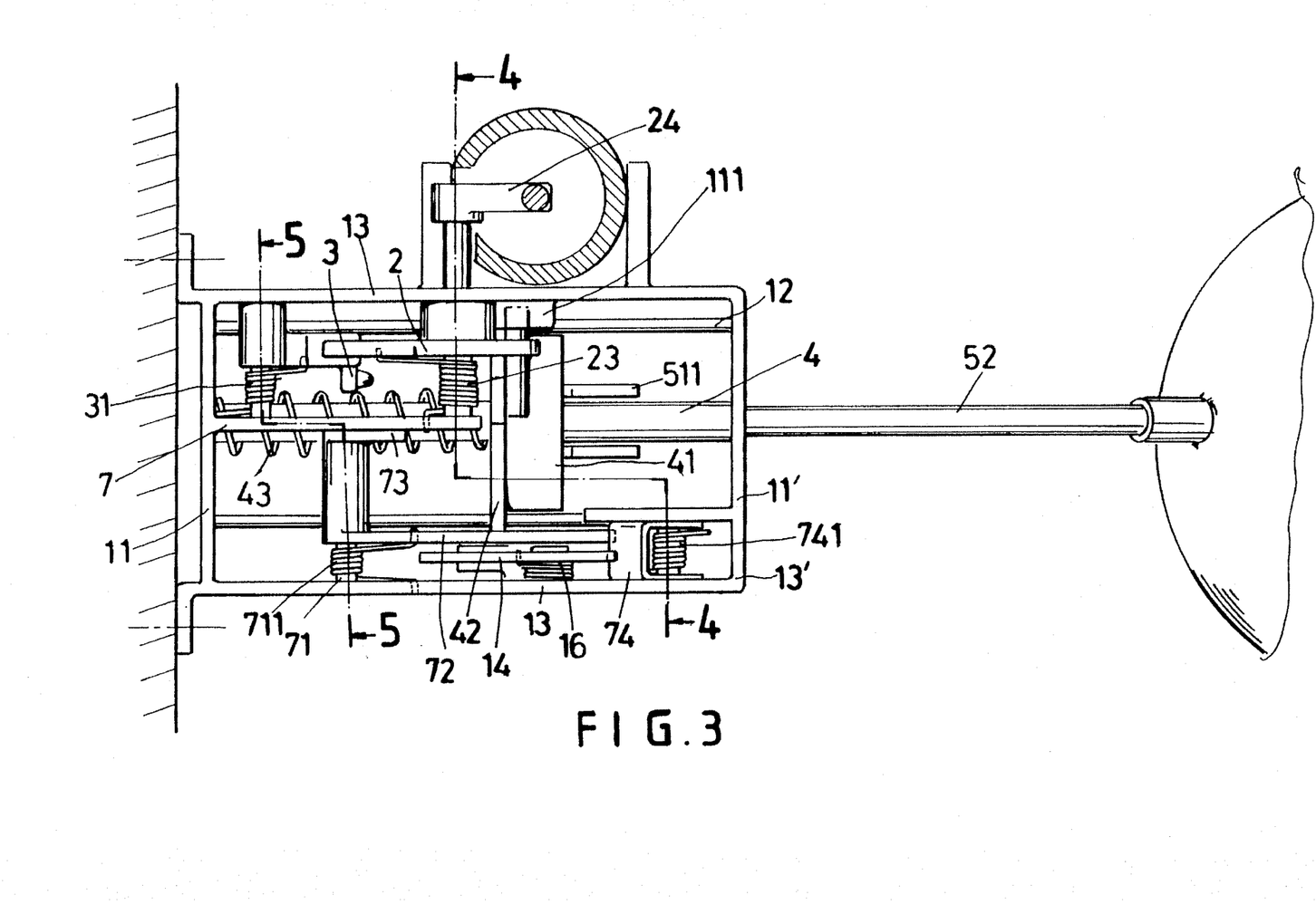
FIG. 3 is a plan view, partially cut-away, of a preferred embodiment of the water level locking device in the present invention, with water flowing into the tank.

A water level locking device for water tanks in the present invention, as shown in FIGS. 1, 2, and 3, includes a stop valve 8 and interacting components contained in a housing 1 including a fan-shaped block 2, an elastic pusher 3, a first shaft 4, a slide block 41 with a locking plate 42, a push arm 51, a second shaft 71, and a position rod 72.

The housing 1 has a front wall 13, a rear wall 13', two opposite side walls 11, 11' abutting the front and rear walls 13, 13', the bottom wall, and an upper wall.

The fan-shaped block 2 is pivotally coupled to the front wall 13 by means of a shaft 231 and has a plurality of ratchet teeth peripherally formed along one side edge. A protruding post 22 extend from both sides of the fan-shaped block 2, and a torque spring 23 is fitted around the shaft 231 so that the fan-shaped block 2 is resiliently biased to return to its initial position after pivotal displacement. A limit block 111 is provided on the front wall 13 near the right lower portion of the block 2 to stop a protruding post 22 of the spring-biased block 2 moves back to its initial position. A swing arm 24 is transversely affixed to the shaft 231 to extend beyond the peripheral extent of the front side wall 13, contacting a push rod 84 of the stop valve 8 so as to force the axial displacement of that push rod 84 responsive to the rotation of shaft 231, and thereby open or close the stop valve 8.

The stop valve 8 includes a cylindrical base 81, a cylindrical connector 82, a cylindrical valve 83, a push rod 84, and a spring 85. The cylindrical base 81 has a female-threaded upper portion to securely engage a male-threaded lower portion of the cylindrical connector 82, and the push rod 84 extends vertical along the axes of the base 81 and the connector 82. Push rod 84 has its bottom end maintaining contact with the swing am 24 to be axially displaced thereby. The cylindrical valve 83 is coaxially disposed within the connector 82 to be axially displaceable therein with the push rod 84 and has adhesively attached to its bottom surface a soft gasket 831. An inverted U-shaped frame 832 is captured tightly within the valve 83, with the push rod 84 being affixed firmly with and through the inverted U-shaped frame 832 so as to be retained within the valve 83. A large disk 841 and a small disk 842 are concentrically formed on push rod 84; the small disk 842 abutting an upper surface of inverted U-shaped frame 832 to force valve 83 upward when push rod 84 is forced upward, and the large disk 841 serving as a valve to engage and thus block the opening in valve 83 through which push rod 84 passes when push rod 84 is forced downward, in part, by spring 85 and water pressure. A resilient gasket 843 is adhesively attached to the bottom surface of large disk 841 to seal this engagement.

Movement of the valves 83 and 841 are responsive to displacement of float rod 52. As is evidenced by the Figures, in-flow of water passes through and around disk or valve 841. Upon seating of valve 841 on valve 83, water flow is terminated through valve 841 with water continuing to flow around valve 841. At this point, both valves 841 and 83 are displaced until seating on connector 81 thereby terminating all water flow.

An elastic pusher 3 pivotally coupled to the rear side wall 13' by a shaft is provided adjacent the fan-shaped block 2. A torque spring 31 is fitted about the shaft to resiliently bias the pusher 3 away from side wall 11'. Elastic pusher rod 3 has a pawl 32 extending out from an upper middle portion thereof to normally engage one of the ratchet teeth 21 of the fan-shaped block 2, thus limiting the block 2 to counter-clockwise rotation about shaft 231.

Figure 4:
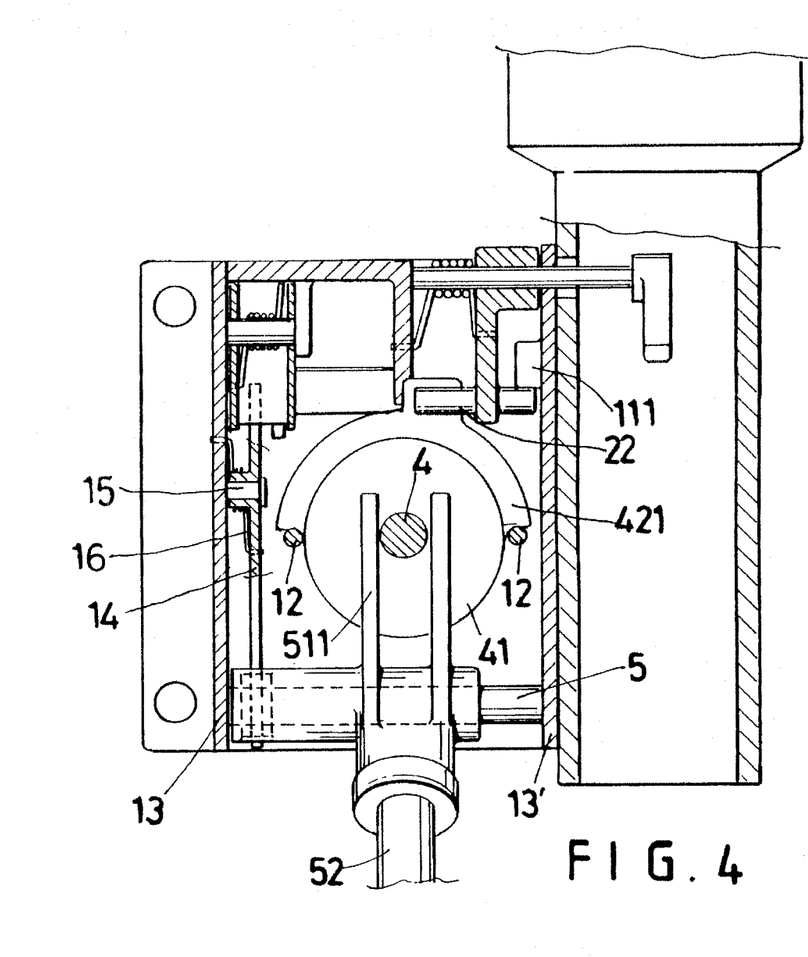
FIG. 4 is a sectional view along Line 4—4 of FIG. 3.

The first elongate horizontal shaft 4 is provided to extend horizontally between the two opposite side walls 11, 11' of the housing 1 and located slightly below the vertical midpoint of housing 1. A slide block 41 formed of a plastic composition is slidably coupled to the first shaft 4 so as to be displaceable over the axis thereof. A locking plate 42 attached on a substantially planar surface of the slide block 41 and a coil spring 43 of a larger diameter than that of the first shaft 4 is fitted about the first shaft 4 between the locking plate 42 and a side wall 11' of the housing 1. A semi-circular ring 421, as shown in FIG. 4, is provided peripherally about the locking plate 42, having two ends resting on and guided by two small rods 12, 12 located between the side walls 11, 11' of the housing 1.

A locating rod 5 is provided between the front and rear walls 13, 13' near the bottom of the housing 1, and a push rod 51 is pivotally coupled to that locating rod 5 to push the slide block 41 axially along the first shaft 4. Push arm 51 is formed with a pair of parallel arm portions 511 engaging slide block 41 on opposite sides of the first shaft 4, as shown in FIG. 4, to transfer the pivotal displacement of the float rod 52 about locating rod 5 caused by the varying water level to the block 41 for corresponding linear displacement thereof. An outer end of the push arm 51 extends out of the housing 1 and is connected to the float rod 52 to enable this transfer of movement. Push arm 51 is also formed with a contact block 6 for contacting and pivotally displacing a knife-shaped piece 14 pivotally coupled to front wall 13 of the housing 1 by a pivot member 15, and a torque spring 16 is fitted thereabout with its ends fixedly coupled to wall 13 and piece 14 to resiliently bias piece 14 to its initial position.

Figure 5:
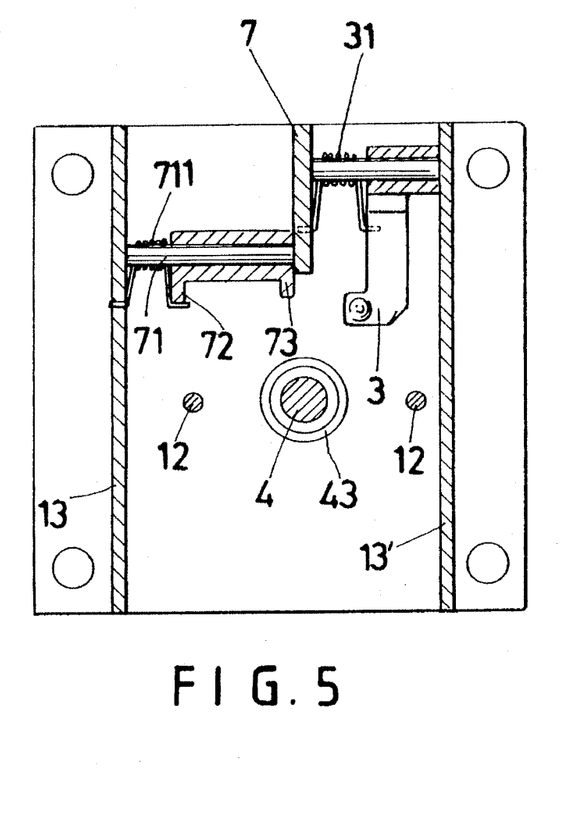
FIG. 5 is a sectional view along Line 5—5 in FIG. 3.
Figure 6:
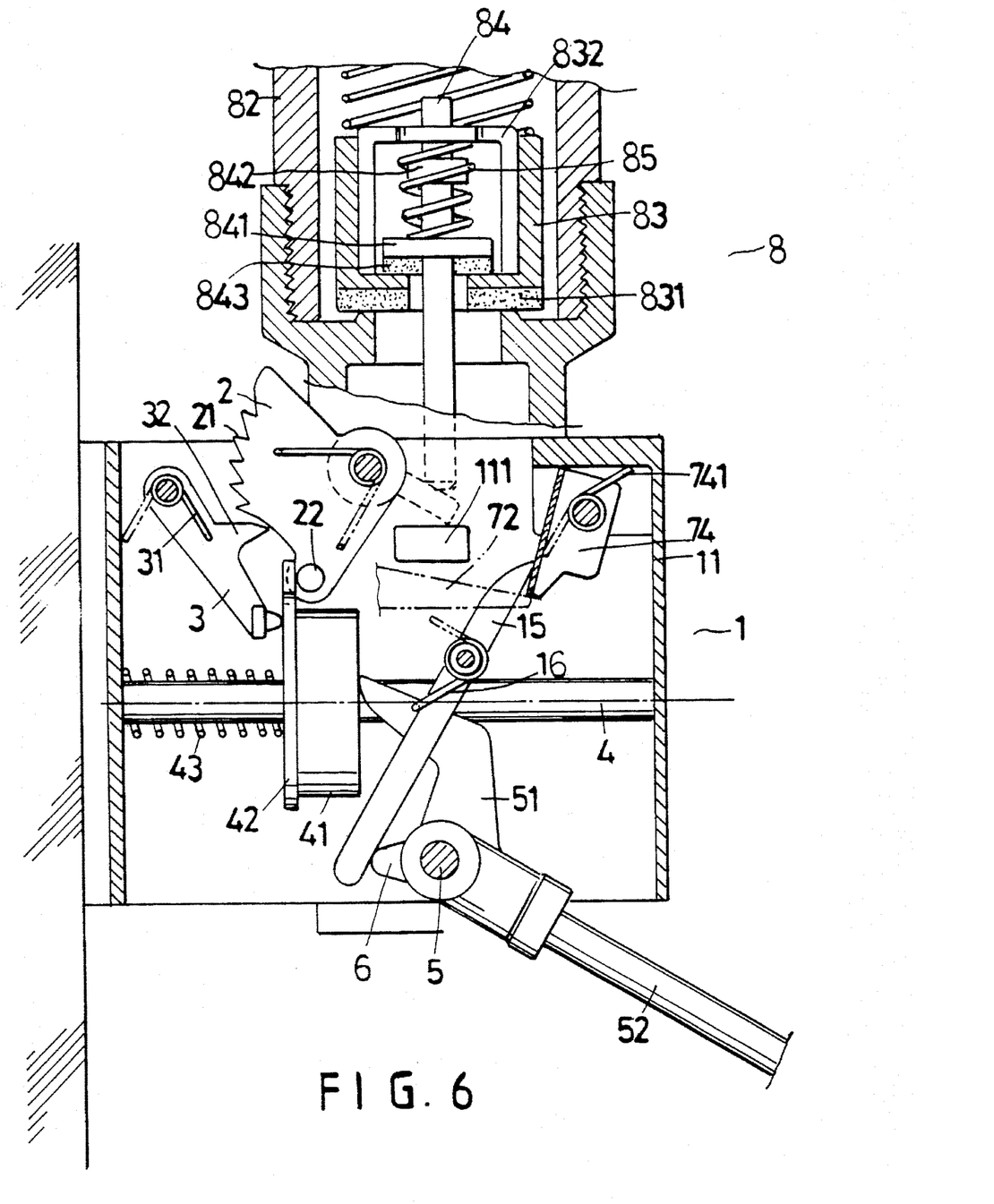
FIG. 6 is a third elevational view, partially cut-away, of a preferred embodiment of the water level locking device in the present invention, with water stopped.
Figure 7:
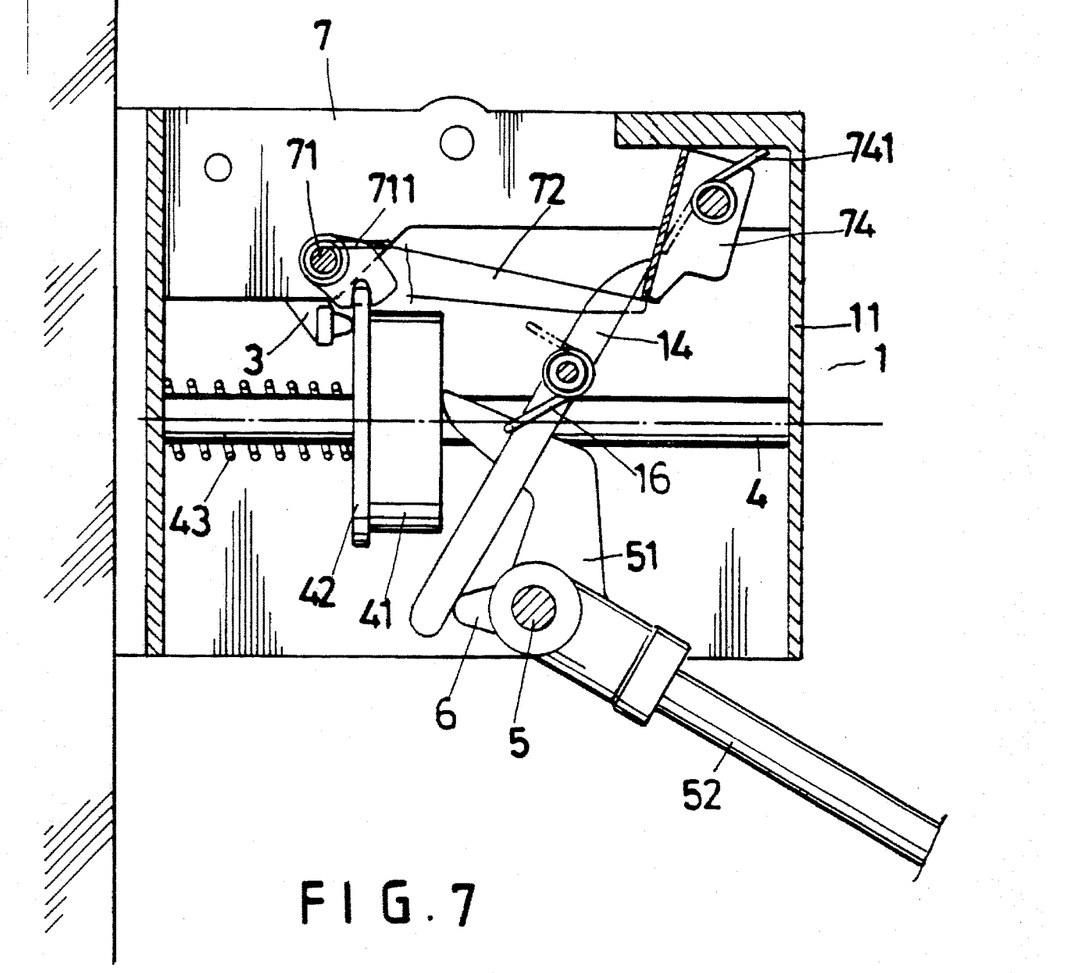
FIG. 7 is a fourth elevational view, partially cut-away, of a preferred embodiment of the water level locking device in the present invention, with water stopped.
Figure 8:
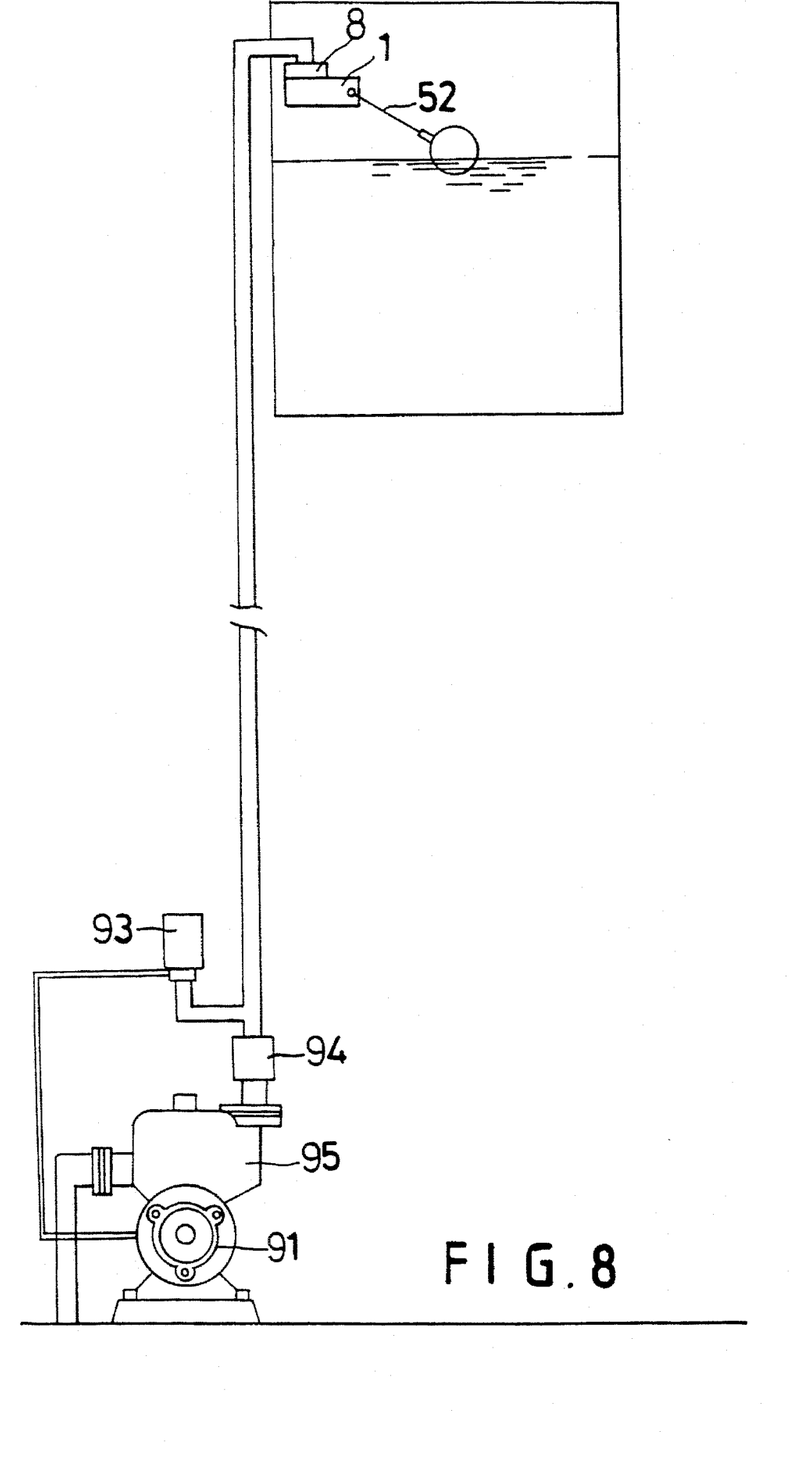
FIG. 8 is a schematic view of a preferred embodiment of the water level locking device of the present invention installed in a tank with a pumping device.

Referring to FIGS. 5, 6, and 7, a second shaft 71 is located between the front wall 13 and the short side wall 7 extending from the upper wall in parallel with the front wall 13. An L-shaped position rod 72 having a tubular portion is fitted about the second shaft 71. A flat elongate portion extends from one end of the tubular portion to a guide portion 73 having a notch 731 (FIG. 2) formed therein. A torque spring 711 disposed about the second shaft 71, its ends engaging the L-shaped position rod 72 and the front wall 13 to resiliently bias the rod 72 to its initial pivotal position relative to the front wall 13. The free ends of the L-shaped position rod 72 are contacted by an elastic stopper 74 when the float rod 52 is in a pivotal position that indicates the water level is above the preset minimum level. Stopper 74 is pivotally coupled to front wall 13 and resiliently biased in the clockwise direction (in the view shown in FIG. 7) by a torque spring 741.

In operation, when the water level in the tank receives sufficiently to cause the float of float rod 52 to fall below the preset minimum water level, the pivotal displacement of float rod 52 causes the knife-shaped piece 14 to push against the stopper 74. The lower portion of stopper 74 is thereby caused to swing away from contact with rod 72. The upper peripheral portion of the locking plate 42 which had been locked into engagement with the notch 731 of the guide portion 73 of the position lock 72 is thus permitted to separate from the notch 731, being pushed by the expansion of coil spring 43. The locking plate 42 is linearly displaced to the right (in the views of FIGS. 2 and 7) to contact and push a protruding post 22 of the fan-shaped block 2. This causes block 2 to swing counter-clockwise (in the views shown in FIGS. 1 and 2) about the axis of shaft 231, forcing the swing arm 24 to rotate and push up against the push rod 84. As push rod 84 is pushed axially upward in this manner, the gasket 831 of valve 83 is lifted from engagement with the opening in base 81 so as to open stop valve 8 for the flow of water into the tank.

As the stop valve 8 is opened and the water level reaches a preset maximum water level, the rising float of the float rod 52 causes the rod 52 to pivot about locating rod 5. As shown in FIGS. 6 and 7, this causes the push arm 51 to push the slide block 41 along shaft 4, compressing the coil spring 43, forcing the locking plate 42 to engage the notch 731 of the position rod 72, and moving downward the free end of the flat elongate portion of the position rod 72. Next, the continuing advance of block 41 causes locking plate 42 to contact with and push against the elastic pusher 3. This causes the pawl 32 to retract from its engagement with the ratchet teeth 21 of the fan-shaped block 2, the spring bias of the fan-shaped block 2 causing it to rotate until one of its protruding posts 22 abuts a portion of locking plate 42. The free end of position rod 72 swings down to engage the lower end of the stopper 74 stably and immovably. The rotation of block 2 causes the swing bar 24 fixedly coupled to the shaft 231 to swing downward, allowing the push rod 84 to move axially downward by, in part, the expanding force of spring 85 to block the water passages in the stop valve 8 and thereby cut off the flow of water into the tank.

While the preferred embodiments of the invention have been described above, it will be recognized and understood that various modifications may be made herein and the appended claims are intended to cover all such modifications which may fall within the spirit and scope of the invention.

What is claimed is:

1. A water level locking device for controlling water level in a water storage tank responsive to selective movement of a float rod within said water storage tank comprising:

(a) a housing member having a plurality of substantially planar wall surfaces;

(b) a fan-shaped block pivotally coupled to one of said wall surfaces of said housing member about a first axis and resiliently biased in an initial position thereof, said fan-shaped block having a pair of substantially planar faces on opposing sides thereof, each of said faces extending along a plane substantially normal to said first axis and having extending therefrom a protruding post, said fan-shaped block having a plurality of ratchet teeth peripherally formed thereon;

(c) a swing arm fixedly coupled to said fan-shaped block, said swing arm transversely extending from said first axis;

(d) a limit block fixedly coupled to one of said wall surfaces of said housing member for limiting said pivotal displacement of said fan-shaped block, said limit block adapted to engage a protruding poet of said fan-shaped block;

(e) a pawl rod pivotally coupled to one of said wall surfaces of said housing member for releasably locking said fan-shaped block against pivotal displacement thereof, said pawl rod having a pawl projection peripherally formed thereon, said pawl projection adapted to releasably engage one of said ratchet teeth of said fan-shaped block;

(f) a first shaft coupled between a pair of said wall surfaces of said housing member to extend in a longitudinal direction therebetween;

(g) a slide block slidably coupled to said first shaft to be reversibly displaceable in said longitudinal direction, said slide block having a substantially planar locking plate extending along a plane substantially normal to said longitudinal direction, said locking plate having an annular peripheral rim portion;

(h) support means coupled between a pair of said wall surfaces of said housing member for supporting and guiding said reversible displacement of said slide block;

(i) spring means coupled to said first shaft for resiliently biasing said slide block in said longitudinal direction away from one of said wall surfaces of said housing member;

(j) a locating rod rotatably coupled to a pair of said wall surfaces to extend therebetween, said locating rod defining a second axis;

(k) a push arm member coupled to said locating rod to be pivotally displaceable about said second axis responsive to a change in said water level in said water storage tank, said push arm having formed thereon at least one arm contacting said slide block for transferring thereto a displacement force when said push arm is pivotally displaced in a predetermined direction;

(l) a knife-shaped piece pivotally coupled to one of said wall surfaces of said housing member to be pivotally displaceable about a third axis, said knife-shaped piece being resiliently biased in an initial position thereof;

(m) a contact block coupled to said locating rod to be pivotally displaceable about said second axis responsive to said change in said water level in said water storage tank, said contact block contacting said knife-shaped piece for transferring thereto a pivotal displacement force when said contact block is pivotally displaced in said predetermined direction;

(n) a second shaft coupled to a pair of said wall surfaces of said housing member to extend therebetween;

(o) a position rod member rotatably coupled to said second shaft and having a rod portion transversely extending therefrom, said position rod member having a tubular portion disposed coaxially about said second shaft and extending from said rod portion thereof, said position rod member having a guide section coupled to said tubular portion, said guide section having formed therein a notch adapted for releasable locking engagement with said rim portion of said locking plate of said slide block, said position rod member being resiliently biased in an initial position thereof;

(p) a stopper member pivotally coupled to one of said wall surfaces of said housing member to be pivotally displaceable about a fourth axis, said stopper member contacting said rod portion of said position rod member, said stop member being resiliently biased to an initial position thereof to thereby apply a force on said rod portion of said position rod member for releasing said locking engagement of said rim portion of said locking plate with said notch of said guide section of said position rod member, said stopper member being adapted to be pivotally displaced away from said initial position thereof responsive to said pivotal displacement of said knife-shaped piece;

(q) stop valve means coupled to said housing member for reversibly blocking the flow of water into said water storage tank responsive to said pivotal displacement of said swing arm by selective movement of said float rod.

2. A water level locking device for controlling water level in a water storage tank responsive to selective movement of a float rod within said water storage tank comprising:

(a) a housing member having a plurality of substantially planar wall surfaces;

(b) a fan-shaped block pivotally coupled to one of said wall surfaces of said housing member about a first axis and resiliently biased in an initial position thereof, said fan-shaped block having a pair of substantially planar faces on opposing sides thereof, each of said faces extending along a plane substantially normal to said first axis and having extending therefrom a protruding post, said fan-shaped block having a plurality of ratchet teeth peripherally formed thereon;

(c) a swing arm fixedly coupled to said fan-shaped block, said swing arm transversely extending from said first axis;

(d) a limit block fixedly coupled to one of said wall surfaces of said housing member for limiting said pivotal displacement of said fan-shaped block, said limit block adapted to engage a protruding poet of said fan-shaped block;

(e) a pawl rod pivotally coupled to one of said wall surfaces of said housing member for releasably locking said fan-shaped block against pivotal displacement thereof, said pawl rod having a pawl projection peripherally formed thereon, said pawl projection adapted to releasably engage one of said ratchet teeth of said fan-shaped block;

(f) a first shaft couples between a pair of said wall surfaces of said housing member to extend in a longitudinal direction therebetween;

(g) a slide block slidably coupled to said first shaft to be reversibly displaceable in said longitudinal direction, said slide block having a substantially planar locking plate extending along a plane substantially normal to said longitudinal direction, said locking plate having an annular peripheral rim portion;

(h) support means coupled between a pair of said wall surface of said housing member for supporting and guiding said reversible displacement of said slide block;

(i) spring means coupled to said first shaft for resiliently biasing said slide block in said longitudinal direction away from one of said wall surfaces of said housing member;

(j) a locating rod rotatably coupled to a pair of said wall surfaces to extend therebetween, said locating rod defining a second axis;

(k) a push arm member coupled to said locating rod to be pivotally displaceable about said second axis responsive to a change in said water level in said water storage tank, said push arm having formed thereon at least one arm contacting said slide block for transferring thereto a displacement force when said push arm is pivotally displaced in a predetermined direction;

(l) a knife-shaped piece pivotally coupled to one of said wall surfaces of said housing member to be pivotally displaceable about a third axis, said knife-shaped piece being resiliently biased in an initial position thereof;

(m) a contact block coupled to said locating rod to be pivotally displaceable about said second axis responsive to said change in said water level in said water storage tank, said contact block contacting said knife-shaped piece for transferring thereto a pivotal displacement force when said contact block is pivotally displaced in said predetermined direction;

(n) a second shaft coupled to a pair of said wall surfaces of said housing member to extend therebetween;

(o) a position rod member rotatably coupled to said second shaft and having a rod portion transversely extending therefrom, said position rod member having a tubular portion disposed coaxially about said second shaft and extending from said rod portion thereof, said position rod member having a guide section coupled to said tubular portion, said guide section having formed therein a notch adapted for releasable locking engagement with said rim portion of said locking plate of said slide block, said position rod member being resiliently biased in an initial position thereof;

(p) a stopper member pivotally coupled to one of said wall surfaces of said housing member to be pivotally displaceable about a fourth axis, said stop member being resiliently biased to an initial position thereof to thereby apply a force on said rod portion of said position rod member for releasing said locking engagement of said rim portion of said locking plate with said notch of said guide section of said position rod member, said stopper member contacting said rod portion of said position rod member, said stopper member being adapted to be pivotally displaced away from said initial position thereof responsive to said pivotal displacement of said knife-shaped piece; and, (q) a stop valve assembly coupled to said housing member for reversibly blocking the flow of water into said water storage tank responsive to said pivotal displacement of said swing arm by selective movement of said float rod, said stop valve assembly including:

(i) a cylindrical base having an axial passage formed therethrough, said cylindrical base having an upper rim portion;

(ii) a cylindrical connector coaxially coupled to said cylindrical base, said cylindrical connector having a lower rim portion, said lower rim portion engaging said upper rim portion of said cylindrical base, said cylindrical connector having formed therethrough an internal chamber, said internal chamber being in open communication with said axial passage of said cylindrical base when said stop valve assembly is not in a closed state;

(iii) a cylindrical valve received within said internal chamber of said cylindrical connector to be substantially axially displaceable therewithin, said cylindrical valve having a valve surface, a portion of said valve surface reversibly contacting said lower rim portion of said cylindrical connector, whereby said internal chamber of said cylindrical connector is sealed from communication with said axial passage of said cylindrical base to define said closed state of said stop valve assembly; and, (iv) a push rod coupled to said cylindrical valve and extending substantially axially through said internal chamber of said cylindrical connector and said axial passage of said cylindrical base, said push rod having a lower end, said lower end contacting said swing arm, said push rod being resiliently biased axially toward said swing arm.

3. The water level locking device for controlling water level in a water storage tank as recited in claim 3 wherein said cylindrical valve of said stop valve assembly includes:

(a) a bottom member having defining a valve chamber and having a lower face, said lower face having formed therethrough a bottom opening for passage of said push rod therethrough;

(b) an upper frame having substantially an inverted U-shaped contour coupled to said bottom member, said upper frame having an upper face;

(c) a disc member coaxially coupled to a portion of said push rod extending into said valve chamber through said bottom opening, said disc member extending radially from said push rod; and, (d) spring means captured between said upper face of said upper frame and said disc member to resiliently bias said disc member against said lower face of said bottom member, said valve surface being defined by said disc member and said lower face.

* * * * *